Aug. 6, 1929.　　　　B. B. SMITHEY　　　　1,723,983
SAW CLAMP
Filed Aug. 23, 1927
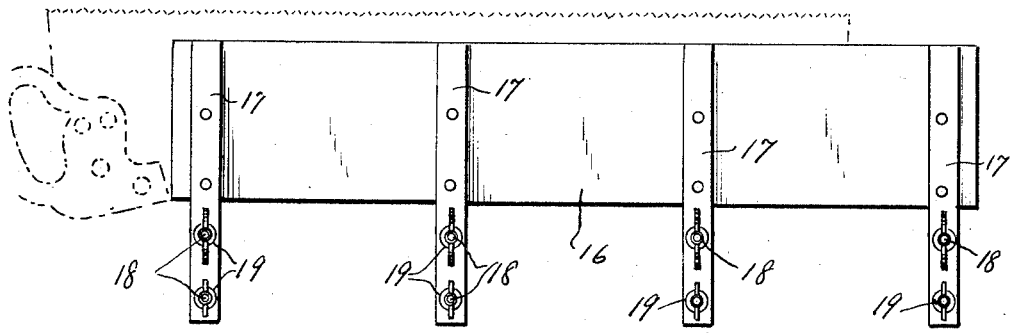
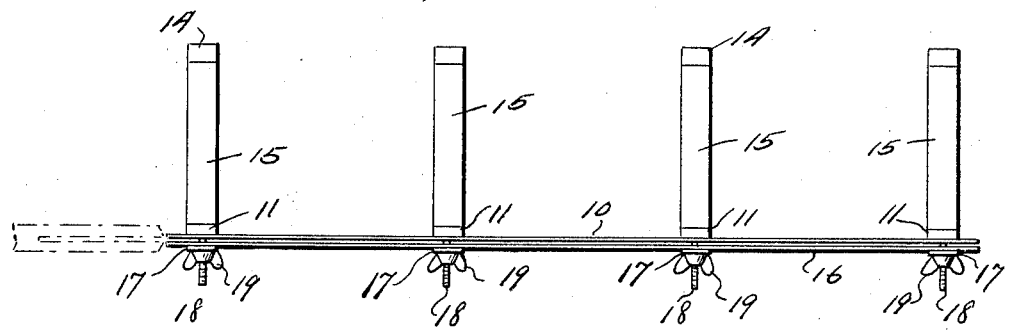
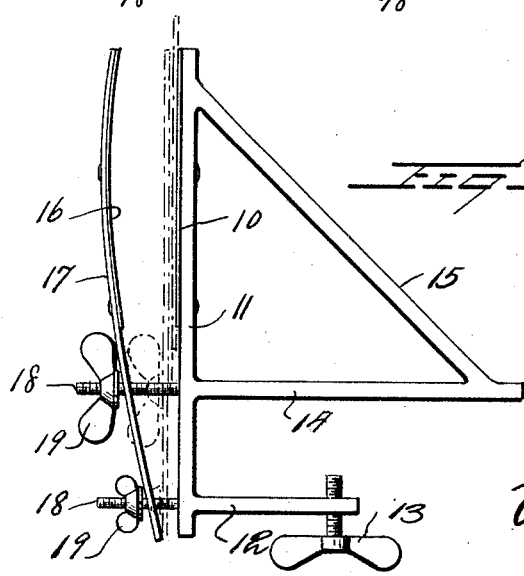
INVENTOR.
B. B. Smithey
Watson E. Coleman
ATTORNEY.

Patented Aug. 6, 1929.

1,723,983

UNITED STATES PATENT OFFICE.

BASIEL B. SMITHEY, OF BIG SPRING, TEXAS.

SAW CLAMP.

Application filed August 23, 1927. Serial No. 214,947.

This invention relates to clamps for holding saws while they are being sharpened or set or for other purposes, and the general object of the invention is to provide a clamp which is very simple, that may be easily set up, which will hold the saw firmly in place, and which will permit the operator to work from either side of the saw.

A further object is to provide a saw clamp which includes two oppositely disposed, resilient strips or plates of metal, one of these plates being curved, and screws whereby the plates may be forced toward each other to bind the saw between them.

A still further object is to provide a clamp which may be readily attached to a bench, plank or any like situation.

My invention is illustrated in the accompanying drawing, wherein:—

Figure 1 is a front elevation of a saw clamp constructed in accordance with my invention;

Figure 2 is a top plan view thereof;

Figure 3 is an end elevation showing the clamp opened;

Referring to this drawing, it will be seen that the clamp consists of two main sections, which will be hereinafter called a front and back section. The back section consists of a metallic plate 10 which is riveted or otherwise attached to a series of rigid vertically extending, metallic bars 11. These extend down below the metallic plate 10 and at their lower ends have laterally extending jaws 12 having clamp screws 13 extending up through the jaws.

Disposed about two inches above the jaws 12 are the rearwardly extending jaws 14, these jaws being braced from the top of the bars 11 by means of the upwardly and inwardly inclined braces 15. Preferably each of the upwardly extending bars 11, the jaws 12 and 14, and the braces 15 are made in one piece of metal forced, cast or otherwise formed. The jaws 12 and 14 are spaced from each other a sufficient distance so that this back piece may be clamped upon a 2 x 6 plank or bench plank. Preferably the bars 11 extend five inches above the jaw inches. Preferably the set screws 13 are ward five inches and the jaw 12 about three inches. Preferably the set screws 13 are provided with round heads.

Coacting with the back section is a front section consisting of a metallic plate 16, to which is riveted a plurality of downwardly extending metallic bars 17. These bars extend downwardly so as to fit against the bars 11. The lower ends of the bars 11 carry outwardly projecting stud bolts 18 which pass through apertures in the bars 17 and carry the nuts 19 upon them so that when these nuts are turned upward the clamping plate 16 will be forced firmly against the clamping plate 10 and the saw which is disposed between the clamping plates will be held firmly in place. Preferably this clamping plate 16 is somewhat curved or bowed vertically so that when the nuts are tightened up the plate will flatten out against the saw, firmly engage the saw and hold it rigidly in place.

It will be understood that the heads of the rivets which hold the metallic plates to the upright bars both for back and front are countersunk so that there will be no protuberance on the inner faces of the plates which would engage against the saw. The clamping plate 16 is preferably only four inches wide. In actual practice, the saw clamp will be about twenty-six inches in length so that if the handle is taken off of the ordinary saw having approximately the same length, the entire saw may be placed between the clamping plates so that the entire length of the saw is firmly clamped and may be perfectly filed from either side.

While I have illustrated certain details of construction and arrangement of parts, I do not wish to be limited thereto as it is obvious that changes might be made in these details without departing from the spirit of the invention as defined in the appended claims.

I claim:—

1. A saw clamp comprising a back section having clamping jaws whereby it may be engaged with a bench and having rigid uprights, a sheet metal plate attached to said uprights, a front section consisting of a plurality of vertically bowed, yielding uprights and a vertically bowed resilient sheet metal plate attached thereto, and means on the back section for engaging the uprights of the front section and drawing said front section toward the back section.

2. A saw clamp of the character described formed to provide a front and a back section, the back section having a plurality of rigid uprights and a transversely and longitudinally flat sheet metal plate attached thereto, the uprights having angularly projecting, vertically spaced jaws adapted to receive a plank between them and the lower jaw having a clamping screw, the uprights being braced from the upper jaw by means of diagonal braces, each of said uprights having projecting from it a plurality of clamping screws, the front section consisting of a plurality of uprights having perforations for the clamping screws and having a resilient sheet metal plate attached thereto outwardly bowed away from the first named plate in a vertical plane, the clamping screws permitting the front section to be forced toward the back section and clamp a saw between them.

3. A saw clamp of the character described comprising a front section and a back section, the back section having a plurality of rigid metallic uprights, each upright being formed with a lower jaw and an upper jaw spaced from each other to embrace a plank, each lower jaw having a set screw and each upper jaw having a brace extending upward to the upper end of the corresponding upright, each upright opposite the upper and lower jaws having outstanding stud bolts, and a transversely and longitudinally flat sheet metal plate attached to said uprights, the front section consisting of a plurality of metallic uprights apertured for the passage of the stud bolts and having a resilient sheet, vertically bowed away from the first named sheet metal plate attached thereto and confronting the first named plate, and nuts on said stud bolts whereby the front section may be forced toward the back section.

In testimony whereof I hereunto affix my signature.

BASIEL B. SMITHEY.